(12) United States Patent
DeLuca

(10) Patent No.: US 8,358,753 B2
(45) Date of Patent: Jan. 22, 2013

(54) INTERACTIVE VOICE RESPONSE (IVR) CLOUD USER INTERFACE

(75) Inventor: Lisa Seacat DeLuca, San Fransisco, CA (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 12/651,283

(22) Filed: Dec. 31, 2009

(65) Prior Publication Data

US 2011/0158392 A1 Jun. 30, 2011

(51) Int. Cl.
*H04M 11/00* (2006.01)
*H04M 1/64* (2006.01)
*H04M 3/42* (2006.01)
*G06F 15/16* (2006.01)

(52) U.S. Cl. ............. 379/88.18; 379/88.11; 379/201.02; 709/224

(58) Field of Classification Search .... 379/88.11–88.25; 709/224–226, 204; 704/257
See application file for complete search history.

(56) References Cited

U.S. PATENT DOCUMENTS

| | | | |
|---|---|---|---|
| 5,802,526 A | 9/1998 | Fawcett et al. | |
| 5,912,952 A | 6/1999 | Brendzel | |
| 6,493,428 B1 | 12/2002 | Hillier | |
| 6,697,460 B2 | 2/2004 | Knott et al. | |
| 6,845,098 B1 | 1/2005 | Strahs | |
| 7,027,571 B1* | 4/2006 | Cook | 379/88.17 |
| 7,027,990 B2 | 4/2006 | Sussman | |
| 7,324,633 B2 | 1/2008 | Gao et al. | |
| 7,515,695 B1* | 4/2009 | Chan et al. | 379/88.18 |
| 7,619,584 B2* | 11/2009 | Wolf | 345/1.2 |
| 8,054,952 B1* | 11/2011 | Or-Bach et al. | 379/88.18 |
| 2002/0080927 A1* | 6/2002 | Uppaluru | 379/88.01 |
| 2003/0115333 A1* | 6/2003 | Cohen et al. | 709/227 |
| 2004/0122941 A1* | 6/2004 | Creamer et al. | 709/224 |
| 2004/0225499 A1* | 11/2004 | Wang et al. | 704/257 |
| 2007/0133759 A1* | 6/2007 | Malik et al. | 379/80 |
| 2008/0062133 A1* | 3/2008 | Wolf | 345/168 |
| 2009/0024453 A1* | 1/2009 | Fraser | 705/10 |
| 2009/0144254 A1 | 6/2009 | O'Sullivan et al. | |
| 2010/0272246 A1* | 10/2010 | Malik et al. | 379/88.18 |

OTHER PUBLICATIONS

Wikipedia; "Tag Cloud"; <http://en.wikipedia.org/wiki/Tag_cloud>; last visited on Mar. 31, 2010.

* cited by examiner

*Primary Examiner* — Mohammad Islam
(74) *Attorney, Agent, or Firm* — Steven M. Greenberg, Esq.; Carey, Rodriguez, Greenberg & O'Keefe

(57) ABSTRACT

Embodiments of the present invention provide a method, system and computer program product for tag cloud prompting in an interactive voice response (IVR) system. In an embodiment of the invention, an IVR prompting method can include loading a set of options in an option set for a caller to an IVR application from over a network, identifying commonly selected options in the options set in a data store of historically selected options, generating a tag cloud for the option set with options in the option set that are more commonly selected being more emphasized than options in the option set that are less commonly selected, and directing a display of the tag cloud in a telephonic device of the caller.

3 Claims, 1 Drawing Sheet

INTERACTIVE VOICE RESPONSE (IVR) CLOUD USER INTERFACE

BACKGROUND OF THE INVENTION

1. Field of the Invention

The present invention relates to interactive voice response (IVR) and more particularly to computer generated prompting for IVR.

2. Description of the Related Art

IVR systems have revolutionized industrial call processing and find wide application across multiple industries—particularly with respect to industrial customer service. An IVR system is an automated call processing system providing self-service interactions with callers through a telephone call. The most basic IVR system provides a sequence of prompts that vary according to caller selections—generally provided in the form of dial tones or spoken choices. More advanced IVR systems handle natural language input from callers in order to properly service caller requests. Even more advanced IVR systems provide an escalation path in which callers ultimately can be routed to a human operator when requested by the caller, or when detected as necessary, but otherwise provide automated responses in the absence of human intervention.

IVR systems usually include a computing system with a call processing gateway between the computing logic of the IVR system and the public switched telephone network (PSTN). In this regard, the call processing gateway generally includes hardware configured for coupling to the PSTN and also to a data communications pathway, either through direct bus connection of the computing system, or a packet switched network connection to a remote server. Some IVR systems include pre-recorded audible responses triggered for playback in response to user input while other IVR systems process scripts such as Voice Extensible Markup Language (VXML) compliant scripts and dynamically generate audible responses—typically by way of a text-to-speech (TTS) engine or through a combination of TTS and pre-recorded audio. Even more advanced IVR systems process spoken user input by way of a speech recognition engine in order to properly select a response to a user inquiry.

The effectiveness of an IVR system often rests with the selection and sequencing of prompts provided to a caller. In response to each prompt provided in a prompt set by the IVR system to the caller, the caller can select a desired option—through the use of dial tone multi-frequency (DTMF) tones to key a selection, or through voice recognition of a spoken selection. In any event, because prompts in an option set provided by an IVR system are spoken by the IVR system and recognized aurally by the caller, in many cases the spoken prompts provided to a caller can be confusing. Consequently, frequently callers select incorrect options in response to the prompts of the option set unintentionally.

Recognizing the potential for callers to select incorrect options in response to aurally recognized prompts in an option set, methods have been proposed to provide for the concurrent visual presentation of prompts in a Web interface. For example, in U.S. Pat. No. 7,324,633 to Gao et al., a web integrated interactive voice response system is described to include an IVR system adapted to different voice menus to a user over a telephone, and a graphical user interface system adapted to provide the different menus in a graphical format to the user over a network connection. Even still, the mere visual display of an IVR option set does not account for the uncertainty faced by callers in making a selection of an option in a prompted option set.

BRIEF SUMMARY OF THE INVENTION

Embodiments of the present invention address deficiencies of the art in respect to prompting in an IVR system and provide a novel and non-obvious method, system and computer program product for tag cloud prompting in an IVR system. In an embodiment of the invention, an IVR prompting method can include loading a set of options in an option set for a caller to an IVR application from over a network, identifying commonly selected options in the options set in a data store of historically selected options, generating a tag cloud for the option set with options in the option set that are more commonly selected being more emphasized than options in the option set that are less commonly selected, a directing a display of the tag cloud in a telephonic device of the caller. As it is well-known in the art, a tag cloud or "word cloud" (or weighted list in visual design) is a visual depiction of word content of a document or Web site, by way of example. The words in a tag cloud are typically listed alphabetically in a fixed display space of a user interface, and the importance of a word relative to the other words in the display space is shown with distinguishing visual characteristics like font size or color.

In one aspect of the embodiment, identifying commonly selected options in the options set in a data store of historically selected options, can include identifying commonly selected options in the options set by the caller to the IVR application in a data store of historically selected options. In another aspect of the embodiment, identifying commonly selected options in the options set in a data store of historically selected options, can include identifying commonly selected options in the options set by other callers to the IVR application in a data store of historically selected options.

In respect to the latter circumstance, generating a tag cloud for the option set with options in the option set that are more commonly selected being more emphasized than options in the option set that are less commonly selected can include retrieving a profile of the caller and also of the other callers to the IVR application, comparing the profile of the caller to the profiles of the other callers, and generating a tag cloud for the option set with options in the option set that are more commonly selected by other callers with at least one common characteristic with the caller being more emphasized than options in the option set that are less commonly selected and options in the option set that are selected by other callers with no common characteristics with the caller. For example, the profile can include the demographics of the caller.

In another embodiment of the invention, an IVR data processing system can include a host server with at least one processor and memory configured for communicative coupling to different telephonic devices over a network and an IVR application executing in the host server. The system also can include a data store of historically selected options for different option sets prompted to different callers to the IVR application from over the network. Finally, a tag cloud user interface generation module can be provided. The module can include program code that when executed in the memory of the host server loads a set of options in an option set for a caller to the IVR application from over the network, identifies commonly selected options in the options set in the data store of historically selected options, generates a tag cloud for the option set with options in the option set that are more commonly selected being more emphasized than options in the option set that are less commonly selected, and transmits the tag cloud to the caller over the network.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for tag cloud prompting in an IVR system. In accordance with an embodiment of the invention, a call can be received into an IVR system from the telephone or any telephonic device (including a personal digital assistant, smart phone, Internet protocol (IP) phone, soft phone, and the like) of a caller. An initial set of options to be prompted to the caller by the IVR system can be characterized and compared to historical selections of the options. Subsequently, the options in the options set can be transformed into a tag cloud according to the more commonly selected options in the options set—those options in the options set that are more commonly selected appearing more pronounced in the tag cloud than those less commonly selected. The tag cloud in turn can be passed to a telephone display in the telephone of the caller for rendering in the display. Finally, the caller in response to the tag cloud can select an option amongst the set of options through the telephone of the caller. Optionally, the process can repeat for another set of options in the IVR system. In this way, the visual display of the tag cloud can act to assist the caller in responding to prompts in an IVR system.

Figure 1:
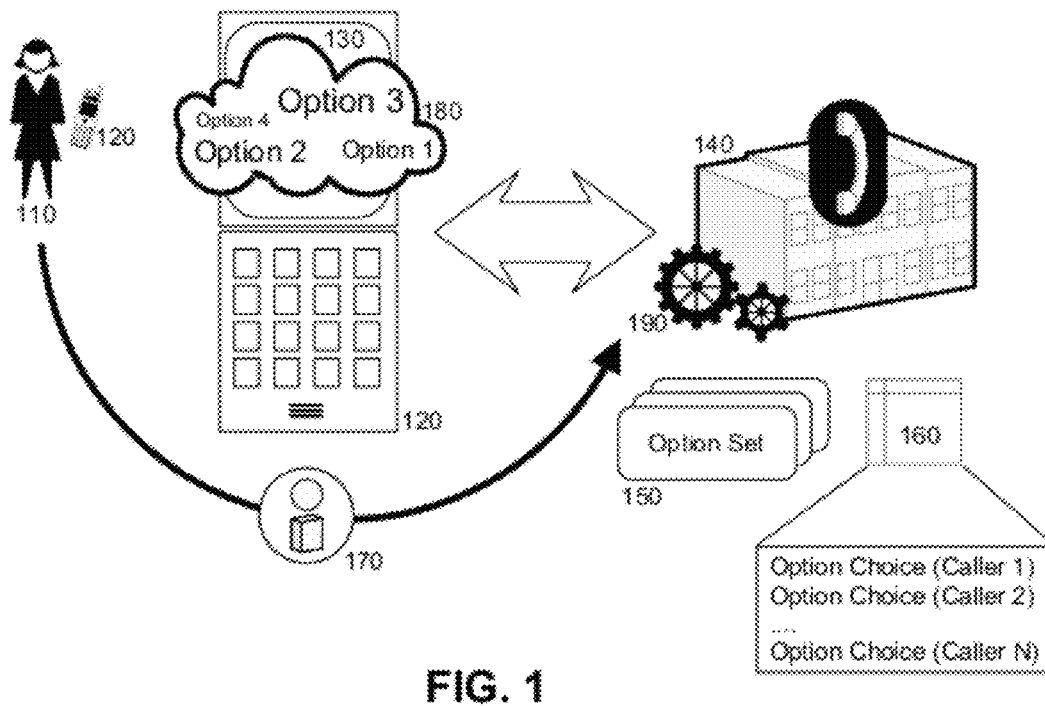
FIG. 1 is pictorial illustration of a process for tag cloud prompting in an IVR system.

In further illustration, FIG. 1 pictorially depicts a process for tag cloud prompting in an IVR system. As shown in FIG. 1, a caller 110 using a telephone 120 or any telephonic device (including a personal digital assistant, smart phone, soft phone, and the like) can establish a telephone call with IVR system 140. Tag cloud user interface generation system 190 can retrieve an initial option set 150 of options to be prompted by the IVR system 140 to the caller 110 along with historical option selections 160 for prior callers prompted with the option set 150. Tag cloud user interface generation system 190 determining the most commonly selected options for the options set 150 from the historical options selections 160. Thereafter, tag cloud user interface generation system 190 can generate a tag cloud 180 of the options in the option set 150 according to the most commonly selected options in the options set 150 and the tag cloud 180 can be displayed 130 on the device 120 of the caller 110. Consequently, the caller 110 can more readily determine an appropriate selection from the option set 150 by reference to the tag cloud 180.

Of note, the determination of the most commonly selected options for the options set 150 can include a determination of the most commonly selected options for the options set 150 based upon a review of historical options selections 160 for a population of prior callers to the IVR system 140. Alternatively, the determination of the most commonly selected options for the options set 150 can be based upon a review of historical options selections 160 for only prior calls by the caller 110 to the IVR system 140. In one aspect of the embodiment of the invention, prior selections evident in the historical options selection 160 can be weighted more for prior selections by other callers to the IVR system 140 that share a common characteristic with the caller 110. In particular, a profile 170 of the caller 110 can be retrieved and demographic characteristics of the caller 110 can be determined. Prior selections by other callers sharing common characteristics with the caller 110, that are apparent in the historical options selection 160 can be emphasized in the tag cloud 180 over prior selections by other callers not sharing common characteristics with the caller 110.

Figure 2:
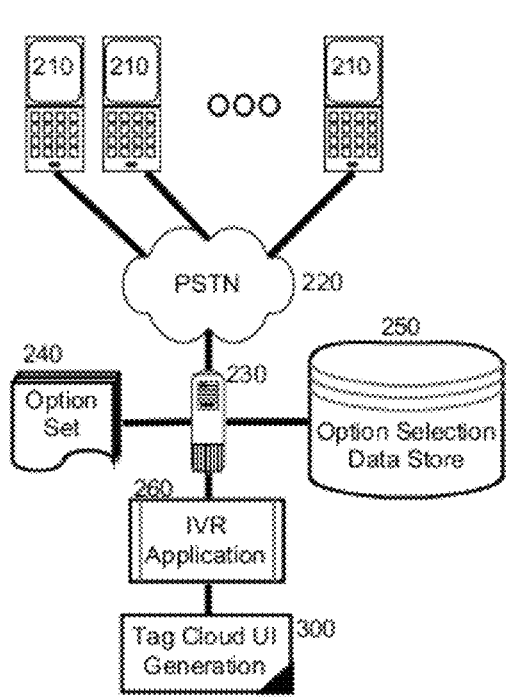
FIG. 2 is a schematic illustration of an IVR data processing system configured for tag cloud prompting; and, FIG. 3 is a flow chart illustrating a process for tag cloud prompting in an IVR system.

The process described in connection with FIG. 1 can be implemented in an IVR data processing system. In yet further illustration, FIG. 2 schematically shows an IVR data processing system configured for tag cloud prompting. The system can include a host server 230 with at least one processor and memory and configured for communicative coupling to different telephonic devices 210 over public switched telephone network (PSTN) 220. It is to be recognized, however, that telephonic devices 210 can interact with host server 230 over a data communications network in part or in full in the case telephonic devices 210 are Internet protocol (IP) phones. It is further to be recognized that the telephonic devices 210 can be traditional telephones, cellular telephones, soft phones, IP phones, smart phones and the like.

An IVR application 260 can execute in the host server 230. The IVR application 260 can be configured for computer-telephonic integration and to provide IVR services through prompting of option sets to callers over the PSTN 220 and the receipt and processing of responses to the prompts by the callers. Of note, tag cloud user interface generation module 300 can be coupled to the IVR application 260. The module 300 can include program code that when executed by the processor of the host server 230, can respond to a call to the IVR application 260 from a telephonic device 210 of a caller from over the PSTN 220, by retrieving an option set 240 of options for prompting by the IVR application 260 to the caller along with historical option selections from a data store of historical options selections 250 for prior callers prompted with the option set 240.

The program code of the module 300 further when executed by the processor of the host server 230 can determine the most commonly selected options for the options set 240 from the historical options selections. Thereafter, a tag cloud of the options in the option set 240 can be generated by the program code of the module 300 according to the most commonly selected options in the options set 240 and the tag cloud can be displayed on the telephonic device 210 of the caller over the PSTN 220. Consequently, the caller can more readily determine an appropriate selection from the option set 240 by reference to the tag cloud.

Figure 3:
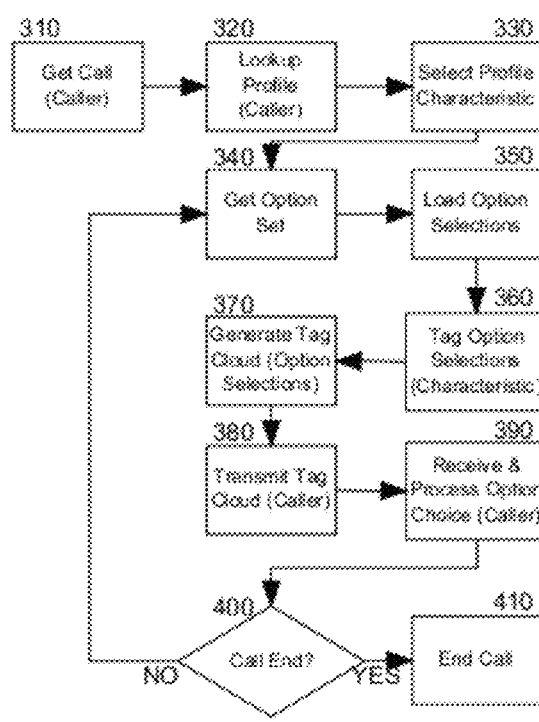

In even yet further illustration of the operation of the tag cloud user interface generation module 300, FIG. 3 is a flow chart illustrating a process for tag cloud prompting in an IVR system. Beginning in block 310, a call can be received in the IVR application from a current caller from over the PSTN (or data communications network, or both). In block 320, a profile of the current caller can be determined and one or more characteristics of the current caller in the profile can be selected in block 330. In block 340 an option set of options to be prompted to the current caller by the IVR application can be loaded and in block 350, a historical set of option selections of the options set by other callers to the IVR application can be loaded.

In block 360, the options in the options set can be tagged according to commonality such as the most commonly selected one of the options—either by all callers to the IVR application, or just in respect to previous selections by the current caller to the IVR application. Other commonalities include common profile demographics in that selections by other callers to the IVR application that share a common demographic, can be tagged as more frequent than selections by callers lacking a common demographic characteristic with the current caller. In any event, in block 370 a tag cloud can be generated with the tagged options in the options set and in block 380 the tag cloud can be transmitted to the current caller.

In block 390, a selection of an option in the option set can be received and processed by the IVR application. Thereafter, in decision block 400 it can be determined if the call is to end based upon a call flow set forth in the IVR application. If not, the process can repeat in block 340 with the retrieval of a new option set. Otherwise, the process can end in block 410 with the termination of the call.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. An interactive voice response (IVR) prompting method comprising:
   receiving a call in an IVR system from a caller;
   retrieving an initial option set of options to be prompted by the IVR system to the caller along with historical option selections for prior callers prompted with the option set;
   determining most commonly selected options for the option set from the historical option selections, including:
      retrieving a profile of the caller and also of other callers to the IVR application;
      determining demographic characteristics of the caller from the profile of the caller; and
      weighting prior selections in the historical option selections by other callers who share a common characteristic with the caller more than prior selections in the historical option selections by other callers who do not share a common characteristic with the caller;
   generating a tag cloud for the option set with options in the option set that are more commonly selected being more emphasized than options in the option set that are less commonly selected; and,
   directing a display of the tag cloud in a telephonic device of the caller.

2. An interactive voice response (IVR) data processing system comprising:
   a host server with at least one processor and memory configured for communicative coupling to different telephonic devices over a network;
   an IVR application executing in the host server;
   a data store of historically selected options for different option sets prompted to different callers to the IVR application from over the network; and,
   a tag cloud user interface generation module comprising program code that when executed in the memory of the host server causes the host server to perform:
      receiving a call in the IVR data processing system from a caller;
      retrieving an initial option set of options to be prompted by the IVR data processing system to the caller along with historical option selections for prior callers prompted with the option set;
      determining most commonly selected options for the option set from the historical option selections, including:
         retrieving a profile of the caller and also of other callers to the IVR application;
         determining demographic characteristics of the caller from the profile of the caller; and
         weighting prior selections in the historical option selections by other callers who share a common characteristic with the caller more than prior selections in the historical option selections by other callers who do not share a common characteristic with the caller;
      generating a tag cloud for the option set with options in the option set that are more commonly selected being more emphasized than options in the option set that are less commonly selected; and,
      directing a display of the tag cloud in a telephonic device of the caller.

3. A computer program product comprising a computer usable storage tangible medium storing computer usable program code for interactive voice response (IVR) prompting, the computer usable program code, when executed by a computer, causes the computer perform the steps of:
   receiving a call in the IVR data processing system from a caller;
   retrieving an initial option set of options to be prompted by the IVR data processing system to the caller along with historical option selections for prior callers prompted with the option set;
   determining most commonly selected options for the option set from the historical option selections, including:
      retrieving a profile of the caller and also of other callers to the IVR application;
      determining demographic characteristics of the caller from the profile of the caller; and
      weighting prior selections in the historical option selections by other callers who share a common characteristic with the caller more than prior selections in the historical option selections by other callers who do not share a common characteristic with the caller;
   generating a tag cloud for the option set with options in the option set that are more commonly selected being more emphasized than options in the option set that are less commonly selected; and,
   directing a display of the tag cloud in a telephonic device of the caller.

* * * * *